(No Model.)
F. GARDNER.
ELECTRICALLY PROPELLED VEHICLE.
No. 473,871. Patented Apr. 26, 1892.
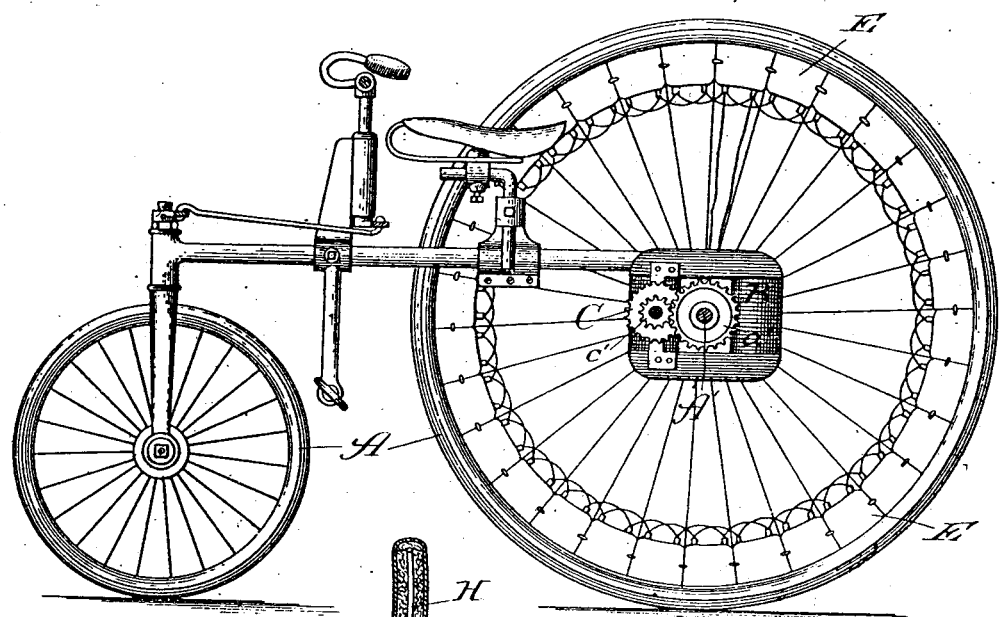
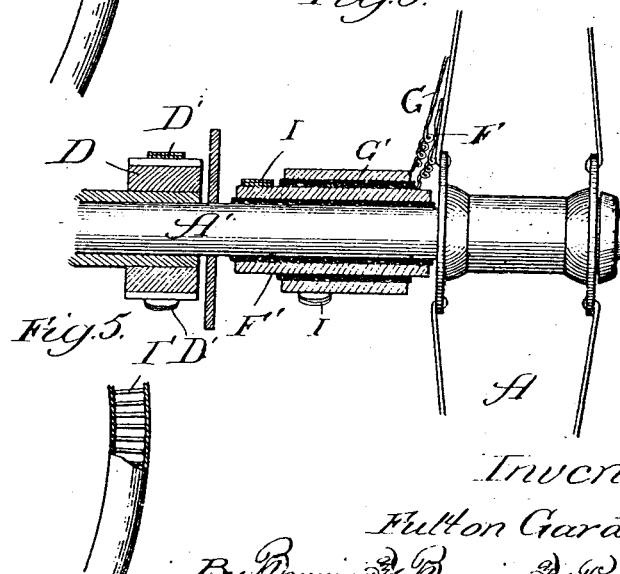
Witnesses:
Chas. E. Gaylord,
Clifford W. White.
Inventor:
Fulton Gardner,
By Banning & Banning & Payson,
Attys.

UNITED STATES PATENT OFFICE.

FULTON GARDNER, OF CHICAGO, ILLINOIS.

ELECTRICALLY-PROPELLED VEHICLE.

SPECIFICATION forming part of Letters Patent No. 473,871, dated April 26, 1892.

Application filed August 31, 1891. Serial No. 404,279. (No model.)

*To all whom it may concern:*

Be it known that I, FULTON GARDNER, a citizen of the United States, residing at Chicago, Cook county, Illinois, have invented a certain new and useful Improvement in Electrically-Propelled Vehicles, of which the following is a specification.

As is well known, electric motors are used to a greater or less extent for propelling tri-cycles and other vehicles. Some form of storage-battery may be used to supply the electricity necessary to operate these motors and drive the vehicle. These batteries are usually of such size as to render it difficult to place them beneath the seat, and, furthermore, when so placed they constitute a dead and unevenly-distributed load that has to be carried by the vehicle.

The object of my invention is to construct a tricycle or other vehicle adapted to be driven by an electric motor in which these storage-batteries shall be placed at various points around one or more of the wheels of the vehicle or in the tire thereof. By means of this construction I distribute the load more uniformly and in such manner as to offer the least possible resistance to propelling the vehicle, a wheel so constructed being of substantially uniform weight and operating somewhat after the manner of a fly-wheel; and my invention consists in the features and details of construction hereinafter described and claimed.

In the drawings, Figure 1 is a side elevation of a tricycle with my improvement applied thereto, one of the wheels being removed; Fig. 2, a plan view of the motor, commutator, and connections; Fig. 3, a cross-section on line 3 of Fig. 2, on an enlarged scale; and Figs. 4 and 5, detail views illustrating modifications.

The tricycle A may be made in any form desired, and, except as hereinafter described, forms no part of my invention and requires no further description. A motor B, of any suitable form, is supported in a case carried by the axle A'. The armature of this motor is shown mounted on a loose sleeve $b$ on the axle, this sleeve carrying a gear which meshes with a gear C on a shaft $c$, and this shaft carries another gear $c'$, meshing with a gear $a'$ on the axle A'. The motor is also provided with the usual commutator D and brushes D'. It should be understood, however, that the form of the motor is immaterial, so far as the present invention is concerned, as I make no claim thereto.

Around the circumference of the wheel, and preferably close to the tire thereof, as shown in Fig. 1, I place the cells of the storage-battery E E, secured in any suitable manner to the spokes or tire. There may be any number of these cells desired. In the drawings I have shown them as extending continuously around the wheel in a single row; but it is not necessary that they should so extend, since a less number of cells may be used, or, if desired, a greater number, the number of cells depending upon the power desired. These cells are connected together, as shown, and the negative poles are connected by a wire F with a sleeve F', mounted on the axle A', while the positive poles are connected by a wire G with a sleeve G', mounted on the same axle. These sleeves being insulated from each other and the axle, brushes I are used to convey the current from these sleeves to the brushes of the motor.

In Fig. 4 I have shown a modification in which the tire contains the storage-battery, the tire providing one metal and the core H the other, and in Fig. 5 I have shown another modification in which the plates I of the battery are placed inside of the tire. In each of these cases there will be the same connections with the sleeves F' and G'.

By means of this construction I am enabled to distribute the weight of the storage-batteries more equally and in such a manner as to interfere as little as possible with the efficient running of the machine, while at the same time providing a simple and easily-constructed device.

While I have described more or less precise forms, I do not intend to limit myself thereto, since I contemplate changes in form and proportion and the substitution of equivalent members, as may be desirable or necessary. For example, the manner of connecting the batteries with the motor and the form of battery may be altered, as desirable or necessary, without departing from the gist of my invention, which consists in placing the cells of the storage-battery at a suitable point around one or more of the wheels of the vehicle with which they are used.

I claim—

1. A wheel for electrically-propelled vehicles, carrying a storage-battery the cells whereof are arranged at suitable points around such wheel, whereby a more uniform distribution of the load is obtained, substantially as described.

2. A wheel for electrically-propelled vehicles, carrying a storage-battery, the cells of such battery being secured to the wheel at points equidistant from the center thereof, substantially as described.

3. A wheel for electrically-propelled vehicles, having a storage-battery contained in the tire thereof, substantially as described.

4. The combination of a vehicle, a motor to propel the same, a storage-battery the cells whereof are secured to one or more of the wheels of the vehicle, and connections between such battery and the motor, substantially as described.

5. A wheel for electrically-propelled vehicles, carrying a storage-battery, the cells of such battery being contained within the tire of the wheel, substantially as described.

6. The combination of a vehicle, a motor to propel the same, a storage-battery contained in the tire of one or more of the wheels of the vehicle, and connections between such battery and the motor, substantially as described.

FULTON GARDNER.

Witnesses:
GEORGE S. PAYSON,
ANNIE C. COURTENAY.